US008411392B2

(12) United States Patent
van de Veerdonk et al.

(10) Patent No.: US 8,411,392 B2
(45) Date of Patent: Apr. 2, 2013

(54) MAGNETIC FIELD SENSOR INCLUDING MULTIPLE MAGNETORESISTIVE SENSING ELEMENTS FOR PATTERNED MEDIA

(75) Inventors: Rene J. M. van de Veerdonk, Wexford, PA (US); Thomas F. Ambrose, Sewickley, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 947 days.

(21) Appl. No.: 12/144,901

(22) Filed: Jun. 24, 2008

(65) Prior Publication Data

US 2009/0316301 A1 Dec. 24, 2009

(51) Int. Cl.
*G11B 5/012* (2006.01)
*G11B 5/33* (2006.01)
*G11B 5/39* (2006.01)
*G11B 5/855* (2006.01)

(52) U.S. Cl. ........ 360/315; 360/110; 360/112; 360/121; 360/135; 360/316

(58) Field of Classification Search .................. 360/112, 360/316, 121, 110, 135, 315
See application file for complete search history.

(56) References Cited

U.S. PATENT DOCUMENTS

| | | |
|---|---|---|
| 5,870,361 A | 2/1999 | Audoin |
| 6,567,364 B1 | 5/2003 | Takahashi et al. |
| 7,502,193 B2 * | 3/2009 | Albrecht et al. ............... 360/75 |
| 2004/0145835 A1 * | 7/2004 | Gill ............................... 360/314 |
| 2005/0007694 A1 * | 1/2005 | Takahashi ..................... 360/112 |
| 2006/0002032 A1 * | 1/2006 | Li et al. ......................... 360/315 |
| 2006/0011904 A1 * | 1/2006 | Snyder et al. .................. 257/14 |
| 2006/0028772 A1 * | 2/2006 | Raastad ......................... 360/315 |
| 2006/0121318 A1 | 6/2006 | Gage et al. |
| 2007/0019335 A1 * | 1/2007 | McFadyen ..................... 360/316 |
| 2007/0195452 A1 | 8/2007 | Covington et al. |
| 2008/0075978 A1 | 3/2008 | Weller et al. |
| 2008/0085425 A1 | 4/2008 | Girt et al. |

OTHER PUBLICATIONS

E. Soljanin et al., "Multihead Detection for Multitrack Recording Channels", IEEE Transactions on Information Theory, Nov. 1998, pp. 2988-2997, vol. 44, No. 7.

* cited by examiner

*Primary Examiner* — Jefferson Evans
(74) *Attorney, Agent, or Firm* — Hall Estill Attorneys at Law

(57) ABSTRACT

An apparatus for sensing magnetic domains in a patterned media that includes a first sensing element and a second sensing element in electrical communication with the first sensing element. The first sensing element has an output voltage lead and the second sensing element has an output voltage lead. The patterned media may be a bit patterned media or a track patterned media.

21 Claims, 3 Drawing Sheets

MAGNETIC FIELD SENSOR INCLUDING MULTIPLE MAGNETORESISTIVE SENSING ELEMENTS FOR PATTERNED MEDIA

BACKGROUND

In an electronic data storage and retrieval system, a transducing head typically includes a writer for storing information on a storage medium and a reader for retrieving that information from the storage medium. In a magnetic data storage system, the reader typically consists of two shields and a magnetoresistive (MR) sensor positioned between the shields. Magnetic flux from the surface of the storage medium causes rotation of the magnetization vector of a sensing layer of the MR sensor, which in turn causes a change in electrical resistivity of the MR sensor. This change in resistivity of the MR sensor can be detected by passing a current through the MR sensor and measuring a voltage across the MR sensor. External circuitry then converts the voltage information into an appropriate format and manipulates that information as necessary.

In magnetic recording, it is desirable to improve the areal density at which information can be recorded and reliably read. This desire has led to a trend toward, for example, shorter bit length along a magnetic recording track and a shrinking track width to provide higher density recording. Currently, readers are based on multilayers of magnetic and non-magnetic material that produce giant magnetoresistance (GMR). These readers are biased with an electrical current that predominantly flows in the plane (CIP) of the thin film multilayer. Similar designs based on GMR and tunneling magnetoresistance (TMR) have the bias current flow perpendicular to the plane (CPP) of the multilayer. Under high areal densities, CIP-GMR readers can have difficulty producing a large enough read-back amplitude. Additionally, CPP-GMR and TMR readers can have large amounts of noise. In addition, a result of narrowing track width is a loss in signal-to-noise ratio (SNR) during readback, as well as, increased intertrack interference (ITI). In high-density, narrow track-width systems ITI degrades the error-rate performance of current readers due to the noise that is picked up from neighboring tracks that are not being read.

SUMMARY

An aspect of the present invention is to provide an apparatus for sensing magnetic domains in a patterned media that includes a first sensing element and a second sensing element in electrical communication with the first sensing element. The first sensing element has an output voltage lead and the second sensing element has an output voltage lead. The apparatus also includes an input current lead coupled to the first sensing element and an output current lead coupled to the second sensing element. The apparatus may include additional sensing elements in electrical communication with the first and second sensing elements. In addition, the first sensing element and the second sensing element may each include a magnetoresistive sensor. The magnetoresistive sensor may be based on the extraordinary Hall effect.

Another aspect of the present invention is to provide a data storage system that includes a patterned media having a plurality of magnetic domains and multiple sensing elements positioned proximate to selected magnetic domains. Each of the multiple sensing elements is coupled to an output voltage lead. The system also includes first and second current leads coupled to the multiple sensing elements. The patterned media may be a bit patterned media. Alternatively, the patterned media may be a track patterned media.

A further aspect of the present invention is to provide a data storage system that includes a track patterned media having a plurality of data tracks and a plurality of sensing elements positioned proximate to the plurality of data tracks.

An additional aspect of the invention is to provide a data storage system that includes a bit patterned media having a plurality of spaced apart magnetic elements and a plurality of sensing elements positioned proximate to the plurality of spaced apart magnetic elements.

These and various other features and advantages will be apparent from a reading of the following detailed description.

DRAWINGS

DETAILED DESCRIPTION

Figure 1:
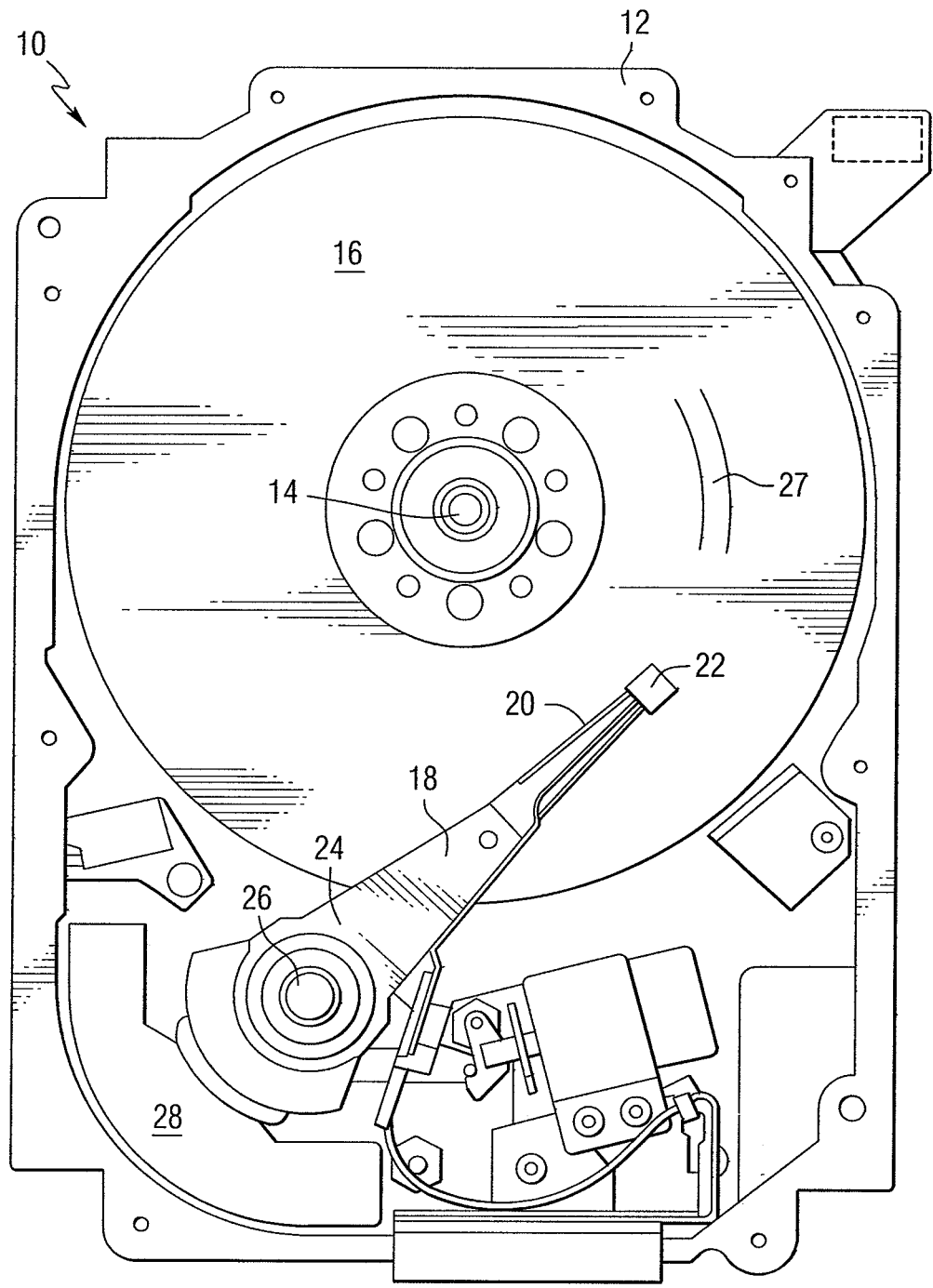
FIG. 1 is a pictorial representation of a system, according to an aspect of the invention.

FIG. 1 is a pictorial representation of a system 10 that can include aspects of this invention. The system 10 includes a housing 12 (with the upper portion removed and the lower portion visible in this view) sized and configured to contain the various components of the system 10. The system 10 includes a spindle motor 14 for rotating at least one disc 16 within the housing 12. At least one actuator arm 18 is contained within the housing 12, with each arm 18 having a first end 20 with a slider 22, and a second end 24 pivotally mounted on a shaft by a bearing 26. An actuator motor 28 is located at the arm's second end 24 for pivoting the arm 18 to position the slider 22 over a desired sector 27 of the disc 16. The actuator motor 28 is regulated by a controller, which is not shown in this view and is well known in the art.

Figure 2:
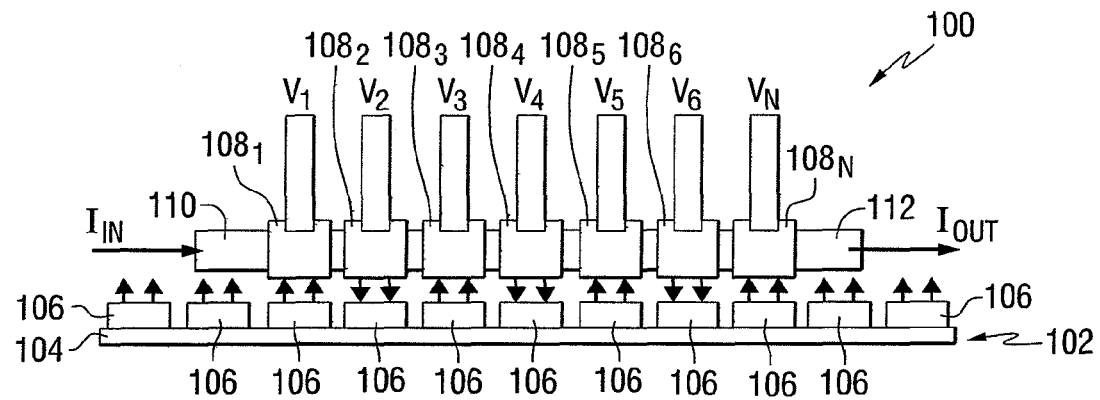
FIG. 2 illustrates an apparatus for sensing magnetic domains in a patterned media, according to an aspect of the invention.

FIG. 2 illustrates an apparatus for sensing magnetic domains. More specifically, the apparatus for sensing magnetic domains may be a reader 100 that can be mounted on, for example, the slider 22 (FIG. 1) for sensing magnetic domains in a data storage media such as, for example, patterned media 102 that is positioned proximate to the reader 100. The patterned media 102 may be, for example, a bit patterned media (FIG. 4) or a track patterned media (FIG. 5) which also may be referred to as a discrete track patterned media. The patterned media 102 includes a substrate 104 and a plurality of magnetic domains 106 having, for example, either an "up" or "down" polarization state as indicated by the arrows shown in FIG. 2.

Still referring to FIG. 2, the reader 100 has a plurality of sensing elements $108_1 \ldots 108_N$. The multiple sensing elements 108 are movable relative to the storage media 102 for positioning the multiple sensing elements 108 proximate to desired magnetic domains 106. Alternatively, the media 102 may be movable relative to the reader 100. The multiple sensing elements 108 may be positioned proximate to multiple adjacent magnetic domains 106, as shown in FIG. 2. Alternatively, it will be appreciated that the multiple sensing elements 108 may be configured for positioning proximate to magnetic domains 106 that are not adjacent to each other, e.g. every other domain 106, or other variations as may be desired.

As further shown in FIG. 2, the reader 100 includes a first current lead 110 and a second current lead 112 coupled to the multiple sensing elements 108. The current leads 110 and 112 may be configured to provide an input current, $I_{IN}$, and an output current, $I_{OUT}$, in order to provide a sensing current through the multiple sensing elements 108.

As illustrated in FIG. 2, each of the multiple sensing elements 108 include at least one voltage lead (voltage lead(s) for each sensing element 108 is generally represented by $V_1 \ldots V_N$) that are adapted to sense a voltage in each of the respective multiple sensing elements $108_1 \ldots 108_N$. The sensed voltage is representative of the polarization state of the particular magnetic domain 106 that is being sensed by the particular sensing element 108 connected to the respective voltage lead. The voltage leads $V_1 \ldots V_N$ are, in turn, connected to a readout electronic circuit (not shown), where the information encoded in the voltage signal is decoded. To pre-process the signals for the multi-element reader 100 with a single voltage lead V per element 108, each voltage signal can be referenced against an individually calibrated reference voltage. The signals from multiple elements 108 can subsequently be processed either jointly or independently. If the signals are processed independently, the channel architecture will consist of several independent circuits, processing each signal stream in parallel. During joint signal processing, however, the channel architecture can be designed to take advantage of the cross-talk between the signals from readback elements on adjacent tracks. This signal contribution is traditionally considered noise.

In accordance with an aspect of the invention, each of the multiple sensing elements $108_1 \ldots 108_N$ may have one or more voltage leads. When two voltage leads per sensing element 108 is utilized, each sensing element 108 is self-referencing meaning that the sensing element's electrical signal can be generated as the voltage difference between the two voltage leads and does not interfere with the electrical signal of other sensing elements. In addition, the signal amplitude may be doubled when two voltage leads per sensing element 108 is utilized. The signal that is picked up by each voltage lead is referenced to the middle of the sensing element 108 with each voltage lead picking up approximately half the amplitude and, therefore, having two voltage leads may double the signal. In the case of having a single voltage lead, the total number of electrical leads that is needed for the reader 100 is reduced and, therefore, simplifying the overall design of the device.

Figure 3:
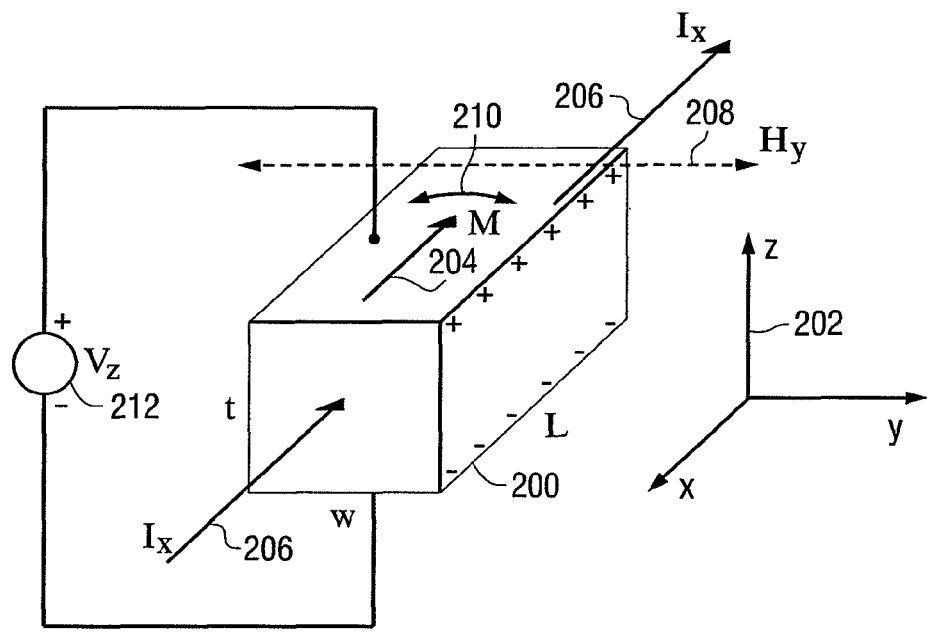
FIG. 3 is a schematic diagram illustrating the extraordinary Hall effect, according to an aspect of the invention.

FIG. 3 is a schematic diagram of a device to measure extraordinary Hall voltage. The sensing elements $108_1 \ldots 108_N$ of the reader 100 can each include a magnetoresistive sensor. According to one aspect of the invention, such a magnetoresistive sensor can be based on the extraordinary Hall effect. As an example of how such a device based on the extraordinary Hall effect may operate, a rectangular ferromagnetic metallic material 200 is positioned in a Cartesian space having an "xyz" axis 202. Rectangular ferromagnetic material 200 is magnetized in the negative x-direction, illustrated as arrow 204. A current, illustrated by arrow 206, passes through material 200 along the x-axis. A magnetic field 208, acting along the y-axis, causes the magnetization of material 200 to rotate, resulting in a net magnetization component 210 along the y-axis. The current 206 and y-axis magnetization component 210 induce a voltage 212 along the z-axis. Voltage 212 is known as the extraordinary Hall voltage. The current 206, y-axis magnetization component 210 and voltage 212 are mutually orthogonal.

Ferromagnetic material 200 exhibits a large Hall resistivity and can include iron platinum (FePt) alloys. Additionally, material 200 can, as examples, include any combinations of cobalt, nickel, iron, holmium, platinum, osmium, bismuth, boron, dysprosium, gadolinium, and terbium. The material need not form a single layer, but can include multiple layers. Multiple layers can allow for a differential sensor. For example, a Terfenol-D, tantalum, FePt multilayer sensor will produce a Hall signal only when the sensor is positioned over a group of two adjacent bits that rotate magnetization of the Terfenol-D and FePt layers in opposite directions. Otherwise, a null voltage occurs when the magnetizations of the Terfenol-D and FePt layers rotate in the same direction. Additionally, a height (t), width (w) and length (L) of material 200 can be chosen to maximize a Hall resistivity value for material 200. Furthermore, the height, width and length can be modified to reduce resistance in one or more directions, reduce power consumption, decrease current density and improve magnetic sensitivity.

The components of the extraordinary Hall effect device of FIG. 3 can be implemented as the individual sensing elements $108_1 \ldots 108_N$ of the reader 100 in a read/write head carried by slider 22. The reader 100 can further be used with or without magnetic shields, as desired.

Figure 4:
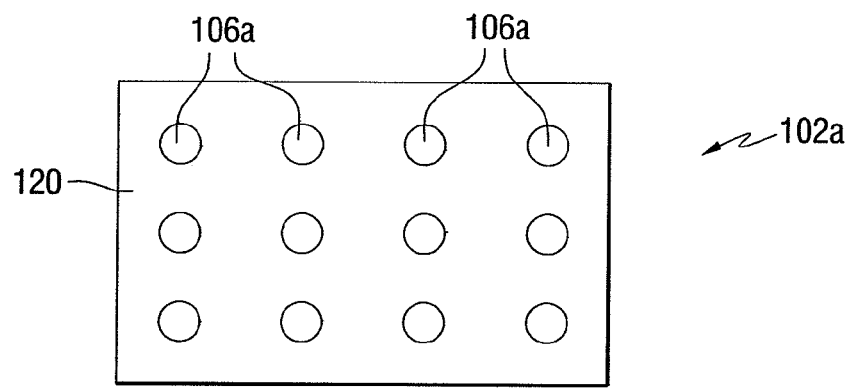
FIG. 4 is a top plan view illustrating a bit patterned media, according to an aspect of the invention.

FIG. 4 illustrates a top plan view of a bit patterned recording media 102a, in accordance with an aspect of the invention. The media 102a includes a plurality of cylindrical magnetic domains or bits 106a that are separated by a non-magnetic spacer material 120. Multiple sensing elements, such as sensing elements $108_1 \ldots 108_N$ of the reader 100 illustrated in FIG. 2, may be positioned proximate to the magnetic domains 106a.

Figure 5:
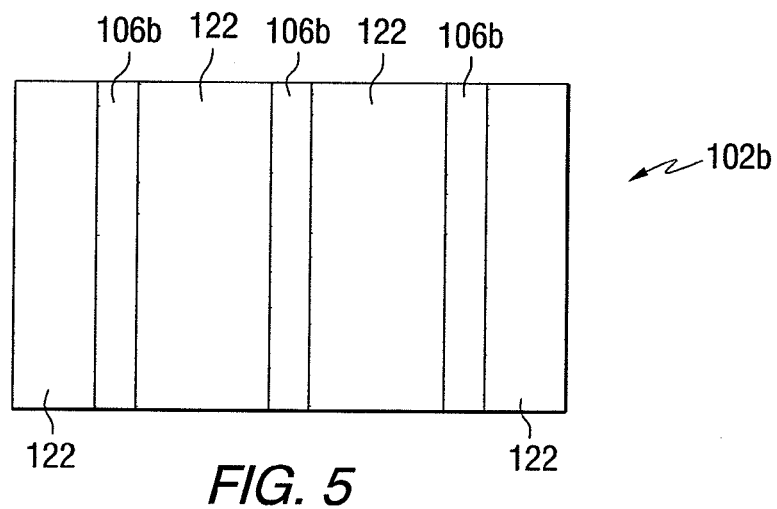
FIG. 5 is a top plan view illustrating a track patterned media, according to an aspect of the invention.

FIG. 5 illustrates a top plan view of a track patterned media 102b, also referred to as a discrete track media, in accordance with an aspect of the invention. The media 102b includes a plurality of spaced apart magnetic recording tracks 106b. The tracks 106b may be spaced apart by air or may be spaced apart by a non-magnetic spacer material 122. Multiple sensing elements, such as sensing elements $108_1 \ldots 108_N$ of the reader 100 illustrated in FIG. 2, may be positioned proximate to the magnetic recording tracks 106b.

The implementation described above and other implementations are within the scope of the following claims.

What is claimed is:

1. An apparatus, comprising:
a first sensing element aligned with a second sensing element proximal a plurality of discrete magnetic bits of a bit patterned media, said first and second sensing elements each comprising a ferromagnetic material, said first and second sensing elements configured to be self-referencing by generating a voltage difference between at least two voltage leads.

2. The apparatus of claim 1, further comprising a third sensing element aligned with said first and second sensing elements, said third sensing element comprising a ferromagnetic material and configured to be self-referencing.

3. The apparatus of claim 2, wherein the first, second and third sensing elements are positioned in a linear array, and the apparatus further comprises:
a patterned media having a plurality of magnetic domains, wherein the first, second and third sensors are separated by distances corresponding to distances between first, second and third ones of the magnetic domains.

4. The apparatus of claim 1, wherein an input current lead and output current lead are adapted to provide a sensing current to the first and second sensing elements.

5. The apparatus of claim 1, wherein a voltage signal for a plurality of output voltage leads connected to the first and second sensing elements is referenced by a voltage difference between at least two of the output voltage leads.

6. The apparatus of claim 1, wherein the first sensing element and the second sensing element each include a magnetoresistive sensor.

7. The apparatus of claim 6, wherein the magnetoresistive sensor is based on the extraordinary Hall effect.

8. The apparatus of claim 1, wherein the first and second sensing elements are respectively positioned proximal to non-adjacent magnetic domains of a storage media.

9. A data storage system, comprising:
a bit patterned media having a plurality of magnetic domains; and
multiple sensing elements positioned proximate to at least one of the magnetic domains, each of said multiple sensing elements comprising a ferromagnetic material and configured to be self-referencing by generating a voltage difference between at least two voltage leads.

10. The system of claim 9, wherein the patterned media is a discrete track media.

11. The system of claim 9, wherein the patterned media is a track patterned media.

12. The system of claim 9, wherein first and second current leads are coupled to at least one of the multiple sensing elements and adapted to provide a sensing current to the multiple sensing elements.

13. The system of claim 9, wherein a voltage signal of an output voltage lead from a plurality of voltage leads connected to at least two of the multiple sensing elements is referenced by a voltage difference between at least two of the output voltage leads.

14. The system of claim 9, wherein each of the multiple sensing elements includes a magnetoresistive sensor.

15. The system of claim 14, wherein the magnetoresistive sensor is based on the extraordinary Hall effect.

16. A data storage system, comprising:
a track patterned media having a plurality of data tracks;
a linear array of a plurality of sensing elements each positioned proximate to said plurality of data tracks and configured to sense a magnetic domain from an adjacent storage media based on the extraordinary Hall effect;
each of said multiple sensing elements comprising a ferromagnetic material and configured to be self-referencing by generating a voltage difference between at least two voltage leads.

17. The system of claim 16, wherein each of the plurality of sensing elements includes a magnetoresistive sensor.

18. The data storage system of claim 16, wherein the ferromagnetic material of at least one sensing element comprises an FePt alloy.

19. A data storage system, comprising:
a bit patterned media having a plurality of spaced apart magnetic elements comprising a discrete magnetic domain; and
a linear array of a plurality of sensing elements separated by distances corresponding to distances between first, second and third magnetic elements, each magnetic element comprising ferromagnetic material and configured to be self-referencing by generating a voltage difference between at least two voltage leads.

20. The system of claim 19, wherein each of the plurality of sensing elements includes a magnetoresistive sensor.

21. The system of claim 20, wherein the magnetoresistive sensor is based on the extraordinary Hall effect.

\* \* \* \* \*